(12) United States Patent
Hong et al.

(10) Patent No.: US 8,762,534 B1
(45) Date of Patent: Jun. 24, 2014

(54) SERVER LOAD BALANCING USING A FAIR WEIGHTED HASHING TECHNIQUE

(75) Inventors: Xinhua Hong, Milpitas, CA (US); Hongbin Wang, San Jose, CA (US); Ying Zhang, Oakland, CA (US); Krishna Narayanaswamy, Saratoga, CA (US); Rakesh Nair, Milpitas, CA (US); Henry Han, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 361 days.

(21) Appl. No.: 13/105,206

(22) Filed: May 11, 2011

(51) Int. Cl.
*G06F 15/173* (2006.01)

(52) U.S. Cl.
USPC .......... 709/226; 709/223; 709/227; 370/389; 370/392

(58) Field of Classification Search
USPC .................................. 709/226; 370/389–392
See application file for complete search history.

(56) References Cited

U.S. PATENT DOCUMENTS

| | | | | |
|---|---|---|---|---|
| 7,155,518 | B2 * | 12/2006 | Forslow | 709/227 |
| 7,177,945 | B2 * | 2/2007 | Hong et al. | 709/238 |
| 7,738,452 | B1 * | 6/2010 | O'Rourke et al. | 370/389 |
| 2002/0165985 | A1 * | 11/2002 | Chen et al. | 709/245 |
| 2003/0065743 | A1 * | 4/2003 | Jenny et al. | 709/219 |
| 2003/0069973 | A1 * | 4/2003 | Ganesan et al. | 709/226 |
| 2003/0187972 | A1 * | 10/2003 | Bauchot | 709/223 |
| 2003/0210689 | A1 * | 11/2003 | Davis et al. | 370/389 |
| 2006/0242300 | A1 * | 10/2006 | Yumoto et al. | 709/226 |
| 2007/0118655 | A1 * | 5/2007 | Tsumura | 709/226 |
| 2007/0192564 | A1 * | 8/2007 | Loeb | 711/216 |
| 2007/0250582 | A1 * | 10/2007 | Sidhu et al. | 709/206 |
| 2008/0028140 | A1 * | 1/2008 | Davis et al. | 711/108 |
| 2008/0037527 | A1 * | 2/2008 | Chan et al. | 370/353 |
| 2008/0154879 | A1 * | 6/2008 | Lin | 707/5 |
| 2008/0168163 | A1 * | 7/2008 | Kurokawa | 709/223 |
| 2009/0234917 | A1 * | 9/2009 | Despotovic et al. | 709/204 |

OTHER PUBLICATIONS

Kumar et al. (Design for implementing NetFlow using existing session tables in devices like Stateful Inspection firewalls and Load balancers Kumar, P.R. ; Deepamala, N. Trendz in Information Sciences & Computing (TISC), 2010 Digital Object Identifier: 10.1109/TISC.2010.5714641 Publication Year: 2010 , pp. 210-213.*

"Distributed hash table", Creative Commons Attribution-Share Alike 3.0 Unported, http://creativecommons.org/licenses/by-sa/3.0/, printed Apr. 3, 2011, (7 pages).

"Consistent hashing", Creative Commons Attribution-Share Alike 3.0 Unported, http://creativecommons.org/licenses/by-sa/3.0/ printed Apr. 3, 2011, (3 pages).

* cited by examiner

*Primary Examiner* — Wing F Chan
*Assistant Examiner* — Razu Miah
(74) *Attorney, Agent, or Firm* — Harrity & Harrity, LLP

(57) ABSTRACT

A fair weighted-hashing technique may be used in load balancing among a group of modules. In one implementation, a device may maintain a table that relates how incoming client resource requests are to be distributed among the modules. The device may update the table, in response to an indication that an additional module, associated with a module identifier, is to be included in the group of modules. The updating may include determining a number of entries to add to the table for the additional module, calculating a first hash value for each of the number of entries, and modifying the table by writing the module identifier to one or more sequential entries of the table, beginning at an index into the table corresponding to the first hash value.

22 Claims, 11 Drawing Sheets

| INDEX | HASH VALUE | MODULE ID |
|---|---|---|
| 0 | $HV_0$ | $ID_0$ |
| 1 | $HV_1$ | $ID_1$ |
| 2 | $HV_2$ | $ID_2$ |
| 3 | $HV_3$ | $ID_3$ |
| 4 | $HV_4$ | $ID_4$ |
| 5 | $HV_5$ | $ID_5$ |
| ••• | ••• | ••• |
| $S-1$ | $HV_{S-1}$ | $ID_{S-1}$ |

410 → INDEX
420 → HASH VALUE
430 → MODULE ID
320

Fig. 4

Fig. 9A — INITIALIZATION (900)

| INDEX | HASH VALUE | ID |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 0 |
| 13 | 0 | 0 |
| 14 | 0 | 0 |
| 15 | 0 | 0 |

Fig. 9B — ADD MODULE 1 (900)

| INDEX | HASH VALUE | ID |
|---|---|---|
| 0 | 0 | 1 |
| 1 | 0 | 1 |
| 2 | 2 | 1 |
| 3 | 0 | 1 |
| 4 | 0 | 1 |
| 5 | 0 | 1 |
| 6 | 6 | 1 |
| 7 | 0 | 1 |
| 8 | 8 | 1 |
| 9 | 0 | 1 |
| 10 | 0 | 1 |
| 11 | 0 | 1 |
| 12 | 0 | 1 |
| 13 | 0 | 1 |
| 14 | 14 | 1 |
| 15 | 0 | 1 |

Fig. 9C — ADD MODULE 2 (900)

| INDEX | HASH VALUE | ID |
|---|---|---|
| 0 | 0 | 1 |
| 1 | 0 | 1 |
| 2 | 2 | 1 |
| 3 | 3 | 2 |
| 4 | 0 | 2 |
| 5 | 0 | 2 |
| 6 | 6 | 1 |
| 7 | 7 | 2 |
| 8 | 8 | 1 |
| 9 | 9 | 2 |
| 10 | 0 | 2 |
| 11 | 0 | 2 |
| 12 | 0 | 2 |
| 13 | 0 | 2 |
| 14 | 14 | 1 |
| 15 | 0 | 1 |

SERVER LOAD BALANCING USING A FAIR WEIGHTED HASHING TECHNIQUE

BACKGROUND

In computer networking, load balancing is commonly used to distribute workload across two or more resources. For example, a group of servers, storage devices, or other resources may collectively provide services to a number of clients. Each client that connects to the group of resources may be initially allocated to one of the resources.

Hashing-based server load balancing is widely employed. Each incoming client may be associated with a key that is mapped, through a hashing function, to the resource that is to be used by the client. Ideally, a high performance load balancing scheme should be able to achieve the following goals simultaneously, without compromising another goal: (1) distribute client requests to resources evenly; (2) minimize traffic interruption even in the event of resource removal or addition; (3) handle a weight associated with each resource (e.g., a first server resource may have twice the capacity as a second server resource, and the first server resource should thus be assigned twice the weight as the first); and (4) optimize the hash lookup operation to reduce operation cost, as speed is a major concern for many load balancing applications.

Existing hashing-based load balancing techniques include the known "consistent hashing" and "distributed hashing" techniques. Both of these techniques may support dynamic joining and removing of resources. The consistent hashing technique, however, can have a worst-case lookup cost of O(n), where n represents the number of resources or modules. The worst-case lookup cost may be experienced when most of the resources fail. The distributed hashing technique may not support weighted hashing and may have an average lookup cost of O(n) or, in some variations, O(log(n)).

SUMMARY

One implementation is directed to a method that may include maintaining a table that relates how incoming client resource requests are to be distributed among modules. The method may further include updating the table, in response to an indication that an additional module, associated with a module identifier, is to be included in the modules, by: determining a number of entries to add to the table for the additional module; calculating a first hash value for each of the number of entries; and modifying the table by writing the module identifier to one or more sequential entries of the table, beginning at an index into the table corresponding to the first hash value. The method may further include looking up one of the modules to handle a particular incoming client resource request, based on a second hash value obtained from information in the incoming client resource request, the second hash value being used as an index into the table to lookup the module identifier of the module to handle the particular incoming client resource request.

In another implementation, a device may include a hash table that includes, for each of a plurality of entries in the hash table, an index into the hash table, a hash value field, and a module identifier field, the module identifier field identifying modules of a group of modules that provide a computing or data storage service to client devices. The device may further include a table manager to update the hash table, in response to an indication that a module, associated with a module identifier, is to be added to the hash table, by writing the module identifier and a first hash value, associated with the module that is to be added, to one or more sequential entries of the table in the module identifier and hash value fields, respectively, beginning at the index into the table corresponding to the first hash value. The device may further include a module lookup component to lookup one of a group of modules, stored by the hash table, to handle a particular incoming client resource request, based on a second hash value obtained from information in the incoming client resource request, the second hash value being used as the index into the hash table to lookup the module identifier of the one of the group of modules to handle the particular incoming client resource request.

In another implementation, a number of modules may provide computing or data storage services to client devices. Additionally, a load balancer may maintain a table that relates how incoming client resource requests are to be distributed among the modules; update the table, in response to an indication that an additional module, associated with a module identifier, is to be included in the modules, the updating of the table including determining a number of entries to add to the table for the additional module, calculating a first hash value for each of the number of entries, and modifying the table by writing the module identifier to one or more sequential entries of the table, beginning at an index into the table corresponding to the first hash value. The load balancer may additionally lookup one of the modules to handle a particular incoming client resource request, based on a second hash value obtained from information in the incoming client resource request, the second hash value being used as an index into the table to lookup the module identifier of the number of modules to handle the particular incoming client resource request.

BRIEF DESCRIPTION OF THE DRAWINGS

The accompanying drawings, which are incorporated in and constitute a part of this specification, illustrate one or more implementations described here and, together with the description, explain these implementations. In the drawings:

FIG. 4 is a diagram illustrating an example of an implementation of a hash table;

FIGS. 9A-9E are diagrams illustrating states corresponding to an example of modules being added/removed from a hypothetical hash table.

DETAILED DESCRIPTION

The following detailed description of the invention refers to the accompanying drawings. The same reference numbers in different drawings may identify the same or similar elements.

Hashing techniques for load balancing, called "fair weighted-hashing" herein, are described that support hot plugging (insertion) and swapping of resources with a worst-case O(1) lookup cost. The fair weighted-hashing technique may also support assigning weighting values to resources.

Figure 1:
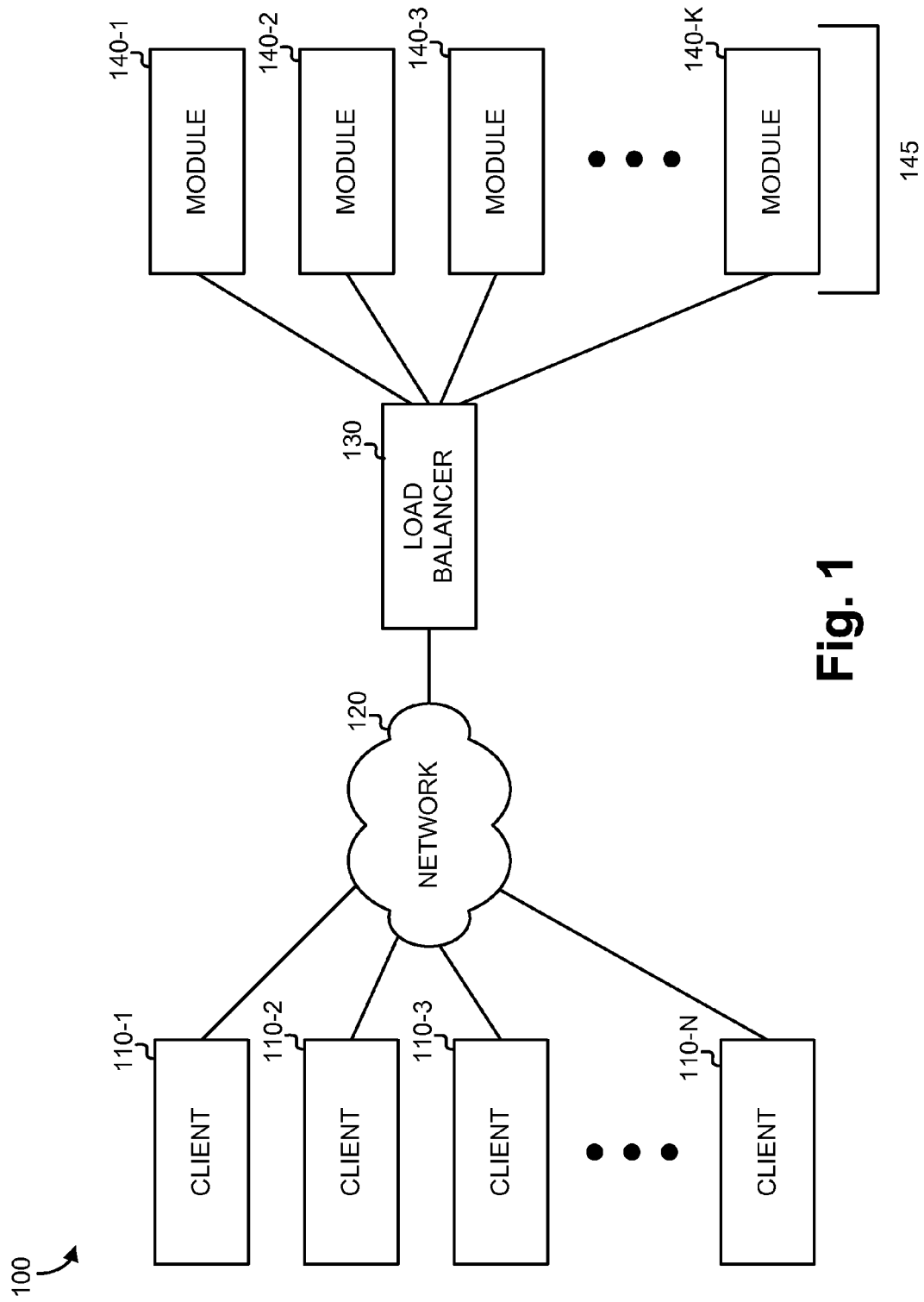
FIG. 1 is a diagram of an example system in which concepts described herein may be implemented.

FIG. 1 is a diagram of an example system 100 in which concepts described herein may be implemented. System 100 may include clients 110-1 through 110-N (referred to herein collectively as "clients 110" or generically as "client 110"), a network 120, a load balancer 130, and modules 140-1 through 140-K (referred to herein collectively as "modules 140" or generically as "module 140").

Clients 110 may include computing devices that access resources or services provided by modules 140. Clients 110 may include, for example, personal computers, laptops, tablet computers, smart phones, personal digital assistants, or other types of computing devices. For example, each of clients 110 may be operated by a user that is using an application that connects to a distributed database implemented by modules 140.

Network 120 may include any type of network, such as a local area network (LAN), a wide area network (WAN), a telephone network (e.g., the Public Switched Telephone Network (PSTN) or a cellular network), an intranet, the Internet, or a combination of networks. Clients 110 may connect to network 120 via wired and/or wireless connections.

Network 120 may generally connect clients 110 to load balancer 130. In some implementations, network 120 may be omitted. Alternatively, load balancer 130 may be connected to modules 140 through network 120 or through another network.

Load balancer 130 may operate to distribute resource requests from clients 110 to modules 140. Load balancer may be designed to "fairly" distribute resource requests to modules 140 so that the load, caused by clients 110, is relatively evenly distributed to modules 140. Load balancer 130 may use a fair weighted hashing technique to perform load balancing. Load balancer 130 will be particularly described in more detail below.

Modules 140 may include resources that are used to provide data and/or services to clients 110. Modules 140 may include computer servers, storage servers, or other types of computing devices. Modules 140 may include servers such as, for example, web servers, servers for technical computing, database servers, or other types of servers. Modules 140 may be thought of as a group of modules 140, labeled as module group 145, that collectively provide the desired services to clients 110. For a large scale web server facility, for example, many tens or hundreds of modules may operate to provide access, to a large number of users, to a web site.

When a client 110 initially connects to one of modules 140, load balancer 130 may choose one of modules 140 to which to direct the client request. It may be desirable to direct subsequent accesses by the same client 110 to the same module 140. In this manner, session state information or other data that is cached locally by a module 140 can be used to efficiently handle the client requests.

In practical implementations, modules 140 of a module group 145 may occasionally fail, be taken offline for service, or substituted (hot swapped) for other modules. Additional modules 140 may be added (hot plugged) while module group 145 continues to function. These operations may be performed without disrupting or minimally disrupting the overall operation of module group 145. For example, for a failing module 140, clients 110 that were being routed to that module 140 should be distributed to the remaining modules 140 without interrupting the operation the remaining modules 140.

Different ones of modules 140 may be associated with different capabilities. For example, in a web serving environment, newer or more expensive modules 140 may be associated with faster processors or increased memory. Thus, different modules 140 may be able to handle different numbers of connections. Thus, load balancer 130 may be capable of balancing the load to modules 140 in a way that reflects the relative capability of modules 140.

Although FIG. 1 shows example components of system 100, in other implementations, system 100 may contain fewer components, different components, differently arranged components, and/or additional components than those depicted in FIG. 1. Alternatively, or additionally, one or more components of system 100 may perform one or more tasks described as being performed by one or more other components of system 100.

Figure 2:
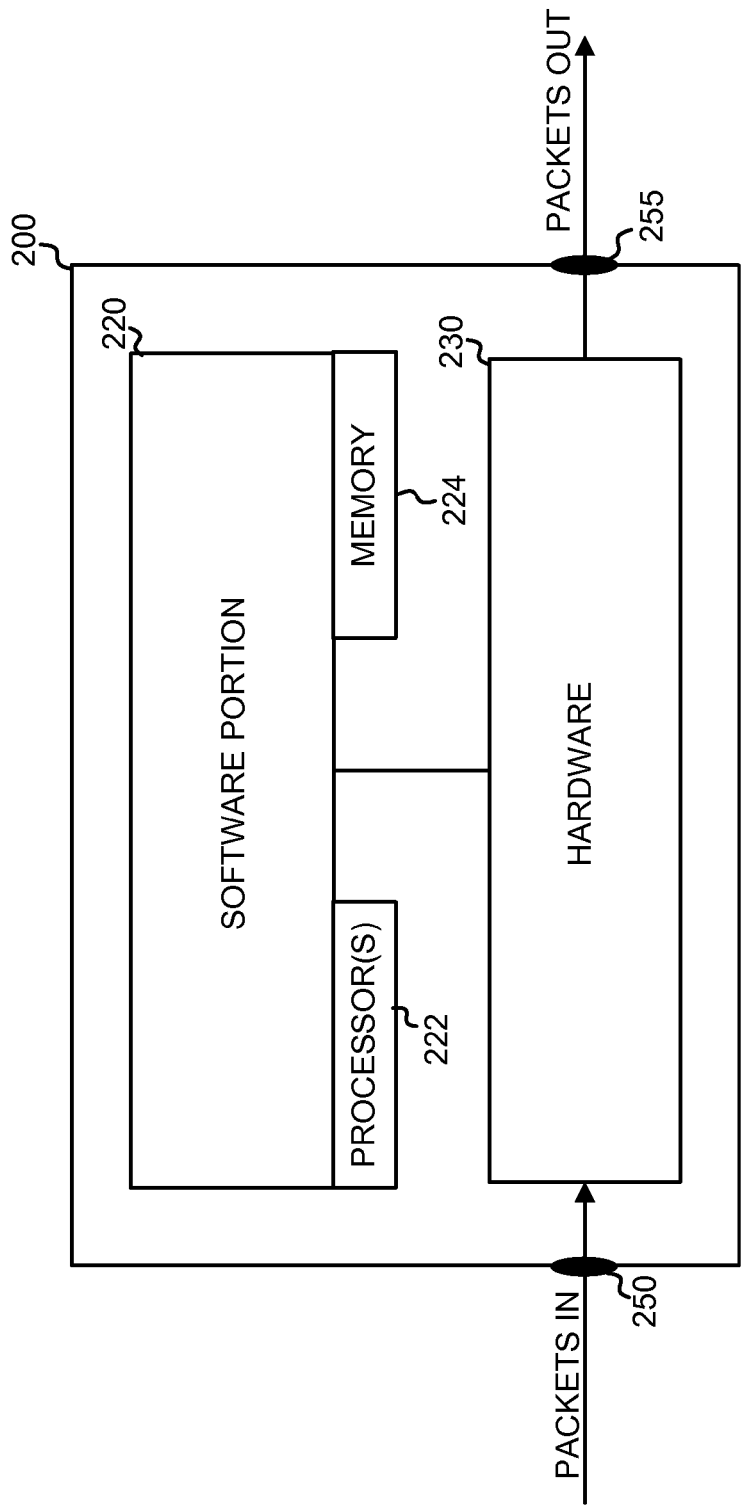
FIG. 2 is a block diagram of an example computing device which may correspond to one of the devices shown in FIG. 1.

FIG. 2 is a block diagram of an example computing device 200, which may correspond to load balancer 130 and/or module 140. In order to increase throughput, computing device 200 may use dedicated hardware to assist in processing incoming traffic. As shown in FIG. 2, computing device 200 may generally include a software portion 220 and a hardware portion 230.

Software portion 220 may include software designed to control computing device 200. In general, software portion 220 may implement the functions of computing device 200 that are not time critical. The functions described as being performed by software portion 220, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memories (RAMs), read-only memories (ROMs), and/or other types of dynamic or static storage devices that may store information and instructions for execution by one or more processors 222. In general, software portion 220 may perform certain functions in response to processor(s) 222 executing software instructions contained in a computer-readable medium, such as memory 224. A computer-readable medium may be defined as a non-transitory memory device. A memory device may include space within a single physical memory device or spread across multiple physical memory devices.

Hardware portion 230 may include circuitry for efficiently processing traffic received by computing device 200. Hardware portion 230 may include, for example, logic, such as an application specific integrated circuit (ASIC), a field programmable gate array (FPGA), and/or a content-addressable memory (CAM). When computing device 200 includes routing and/or switch functionality, hardware portion 230 may receive incoming packets, extract header information for the packets, and process the packets based on the extracted header information.

Computing device 200 may additionally include one or more input ports 250 for receiving incoming traffic and one or more output ports 255 for transmitting outgoing traffic. In some implementations, a port may act as both or one of an input port 250 or an output port 255.

Although computing device 200 is shown as including software portion 220 and hardware portion 230, computing device 200 may, in some implementations, be implemented entirely through hardware. Additionally, computing device 200 may include additional components, fewer components, different components, or differently arranged components than those illustrated in FIG. 2.

Figure 3:
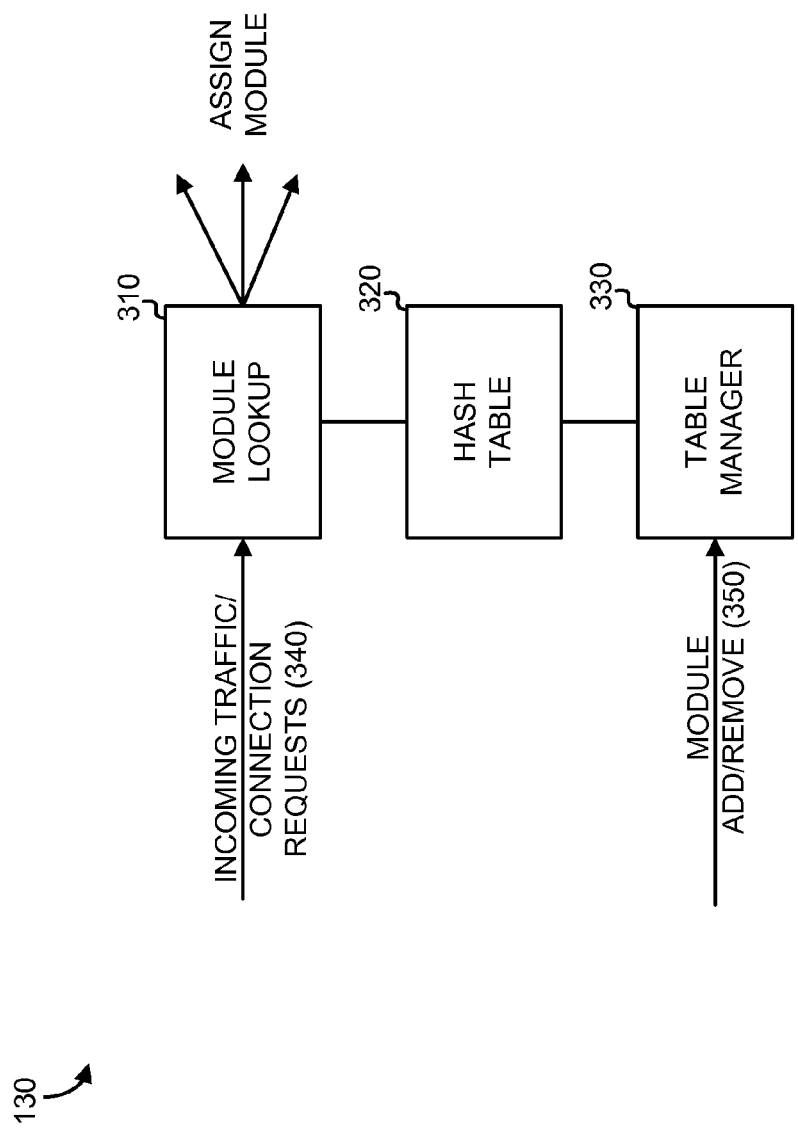
FIG. 3 is a diagram illustrating conceptual components of a load balancer.

FIG. 3 is a diagram illustrating conceptual components of load balancer 130. As shown, load balancer 130 may include a module lookup component 310, a hash table 320, and a table manager component 330.

Module lookup component 310 may receive incoming traffic/connection requests 340, such as incoming connection requests, session initiations, or other traffic relating to a service/data request that should be assigned to one or more of modules 140. Module lookup component 310 may determine, based on hash table 320, which of modules 140 should handle the request. For example, module lookup component 310 may perform a hash operation (e.g., MD4 (message digest algorithm 4), MD5 (message digest algorithm 5), SHA (secure hash function), etc.) on information identifying the connecting client 110, such as the Internet Protocol (IP) address of client 110, to obtain an index into hash table 320. One of modules 140 may correspond to the index in hash table 320 and that module may be assigned to handle traffic/connection request 340 from client 110. Because the index obtained based on the hash function directly corresponds to the assigned module, the assignment of clients 110 to modules 140 may be an O(1) operation.

Table manager component 330 may include logic to manage hash table 320. Table manager component 330 may, for example, receive module add/remove indications 350 for modules 140 being added or removed from module group 145. A module 140 may be removed from module group 145 when a module 140 fails, is replaced (swapped), or removed from module group 145. A module 140 may be added to module group 145, for example, to increase the capacity of module group 145 or as part of a replacement of one module 140 with another. In response to module add/remove indications 350, table manager 330 may update hash table 320 to reflect the new state of module group 145. The operation of table manager 330 will be described in more detail below.

FIG. 3 shows conceptual components of load balancer 130. In other implementations, load balancer 130 may include fewer components, different components, differently arranged components, and/or additional components than those depicted in FIG. 3. Alternatively, or additionally, one or more components may perform one or more tasks described as being performed by one or more other components of load balancer 130.

FIG. 4 is a diagram illustrating an example of an implementation of hash table 320. As shown, hash table 320 may include an index field 410, a hash value field 420, and a module identification (ID) field 430.

Hash table 320 may have a certain number of entries, S, that define the size of hash table 320. The value for S may be a selectable value that is set by an administrator. Index field 410 may include an index value corresponding to each entry in hash table 320, such as the values zero through S−1. In some implementations, an explicit index field 410 may be omitted in hash table 320 and the index may be implied by the data structure used to implement hash table 320 (e.g., a two-dimensional array structure may include a hash value column and a module ID column, which may be accessed using a row index in the range zero to s−1).

Hash value field 420 may store a value that is determined as a hash corresponding to a particular module 140. In one implementation, each hash value field 420 entry may be calculated based on a hash of identification information for a module 140 and based on another value. S hash values, labeled as $HV_0$ through $HV_{S-1}$, are illustrated in FIG. 4.

Module ID field 430 may include a value that identifies a module 140. In one implementation, module ID field 430 may be implemented as a network address of the module. For example, if each of modules 140 of module group 145 is assigned a unique IPv6 or media access control (MAC) address, either the IPv6 address or the MAC address could be used in module ID field 430. In this manner, each value in index field 410 may correspond to a particular module, as indicated by module ID field 430.

The fields shown for hash table 320 are examples of possible fields that may be included in hash table 320 and maintained by table manager component 330. In alternative implementations, different fields, additional fields, or fewer fields may be used in hash table 320.

Figure 5:
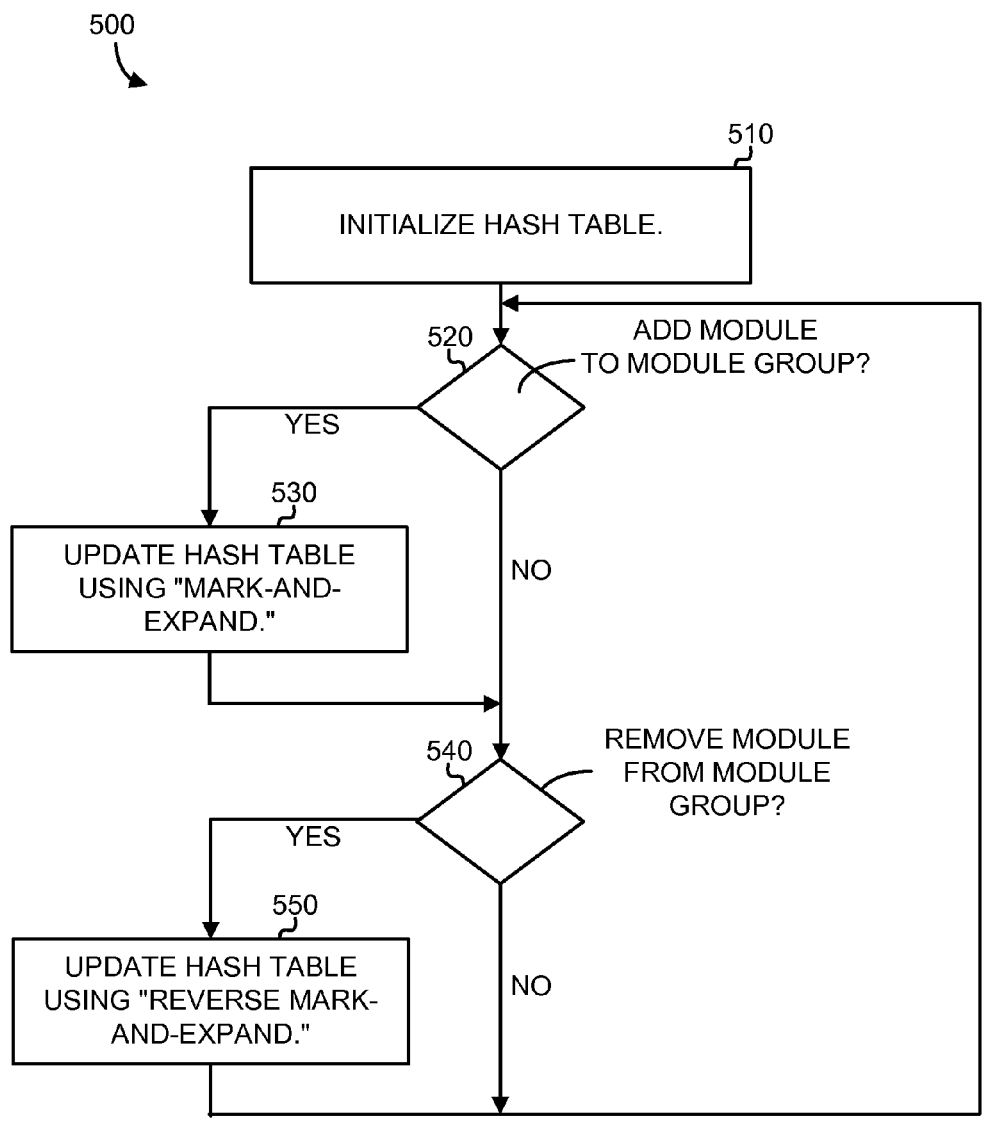
FIG. 5 is a flow chart illustrating an example process through which a table manager of FIG. 3 may add or remove servers from a hash table.

FIG. 5 is a flow chart illustrating an example process 500 through which table manager 330 may add or remove modules from hash table 320.

In general, table manager 330 may update hash table 320 based on a hashing function that exhibits good randomness and fairness. Such hashing functions may include the MD4, MD5, and SHA hashing functions. The MD5 hashing function will be used in the description herein, although another hashing function could alternatively be substituted. A hashing function with good randomness and fairness may be utilized so that entries in hash table 320 are randomly and fairly allocated to each module 140.

Process 500 may include initializing hash table 320 to a size S (block 510), where the size may be chosen in advance, such as by an administrator of module group 145. Initialization of hash table 320 may be performed, for example, when module group 145 is initially setup. To accommodate weighting of modules 140 and the possibility of later adding additional modules, the size of hash table 320 may be chosen as a size that is significantly larger than the greatest number of modules that can be expected to be in module group 145.

Process 500 may include determining whether a module 140 is to be added to module group 145 (block 520). As previously mentioned, a module 140 may be added for a number of reasons, such as in response to an administrator adding a module in order to increase the capacity of module group 145. As another example, during an initial installation or setup of module group 145, a number of modules may be sequentially added to hash table 320 in process 500. In either situation, load balancer 130 may receive an indication, such as from an administrator, of the one or more modules that are to be added.

When a module 140 is to be added (block 520—YES), hash table 320 may be updated using the "mark-and-expand" technique (block 530). The mark-and-expand technique is described in more detail below with reference to FIG. 6. In general, the mark-and-expand technique may operate to equally distribute modules 140 in hash table 320. When a new module 140 is added, entries for the new module 140 may be evenly "grabbed" from the entries corresponding to the existing modules 140. After a new module 140 is added, entries corresponding to all of the modules in hash table 320 may generally remain evenly allocated.

Process may further include determining whether a module 140 is to be removed from hash table 320 (block 540). A module 140 may be removed from hash table 320 for a number of reasons, such as when a module 140 fails, is replaced (swapped) by an administrator, or removed by an administrator. Load balancer 130 may receive an indication, such as from an administrator, of when a module 140 is removed from module group 145. Alternatively, for unplanned removals, such as the failing of a module 140, load balancer 130 may automatically detect the removal of the module (or receive an indication of removal that is automatically generated by another component).

When a module 140 is to be removed (block 540—YES), hash table 320 may be updated using the "reverse mark-and-expand" technique (block 550). The reverse mark-and-expand technique is described in more detail below with reference to FIG. 7. In general, the reverse mark-and-expand technique may operate to maintain an equal distribution of modules 140, in hash table 320, after the removal of a module 140.

When a module is not to be removed (block 540—NO), process 500 may return to process block 520.

Figure 6:
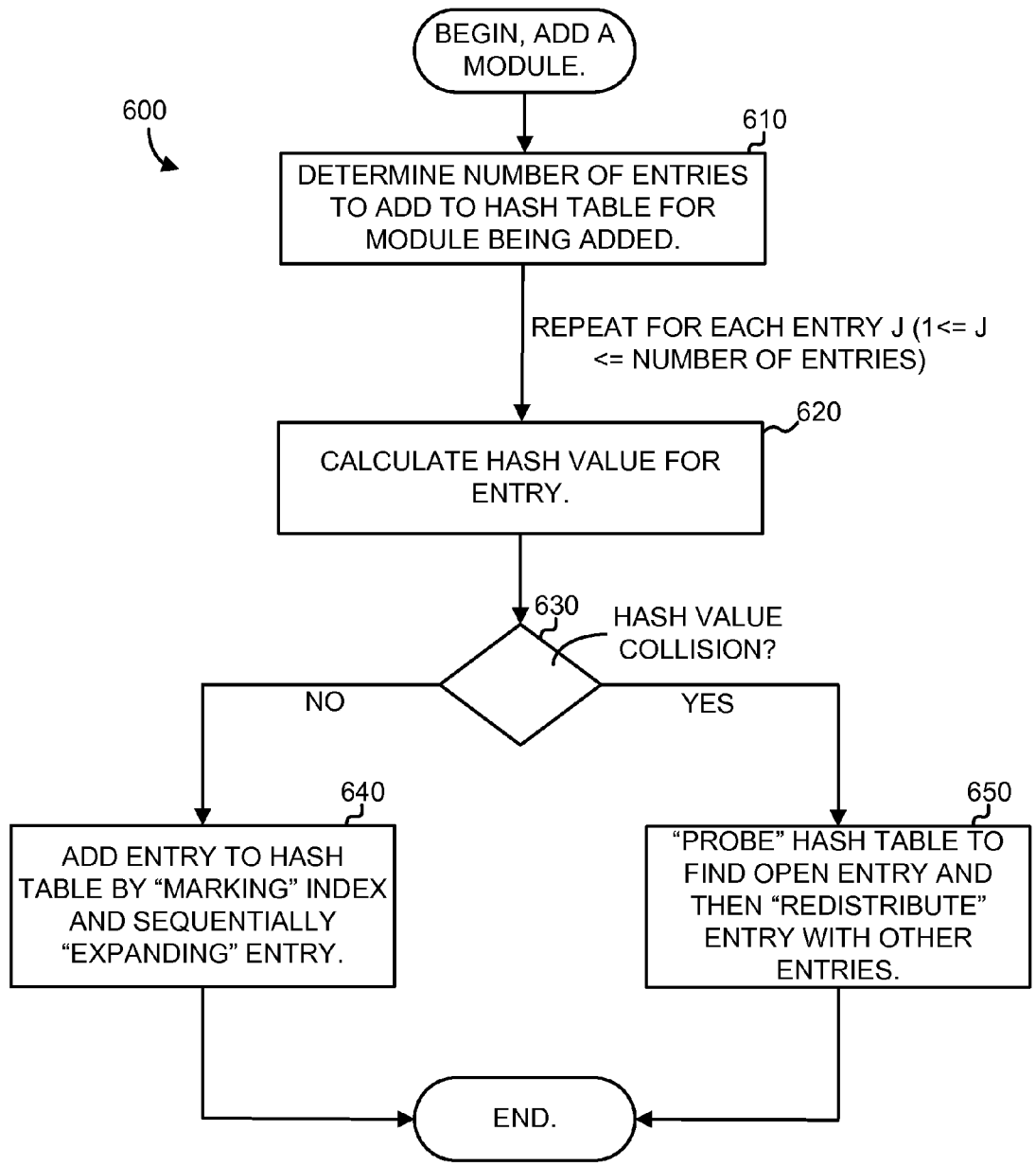
FIG. 6 is a flow chart illustrating an example process for adding a module using a mark-and-expand technique.

FIG. 6 is a flow chart illustrating an example process 600 for adding a module using the mark-and-expand technique, as performed in block 530 (FIG. 5). For the description of process 600, after adding a module, module group 145 has n modules (i.e., n represents the number of modules 140 in module group 145). Further, hash table 320 has a size s and each module 140 is associated with a module identifier, m(i) (corresponding to server ID field 430 in FIG. 4), such as an address or other unique identifier for the module. Further, each module 140 may be associated with a weight, w(i) (1<=i<=n). Module weights may be assigned to reflect the relative capacity or performance of a module 140. Hash table 320 may be assigned a load factor, l, which may be used as a global control of how full hash table 320 will be with hash entries. The module weight and the load factor may be pre-selected by an administrator.

Process 600 may include determining the number of hash entries to write to hash table 320 to correspond to the added module (block 610). In one implementation, the number of entries, for module i, may be calculated as:

$$\frac{s \cdot w(i)}{n \cdot l}. \qquad (1)$$

A looping operation may be performed for each of the number of entries calculated with equation (1). Blocks 620-650 may thus be repeated j times (1<=j<=number of calculated entries).

Process 600 may further include calculating a hash value, h(i,j), for loop j (block 620). The hash value may be based on the module identifier and the loop number. For a hash based on the MD5 hash function, for instance, the hash value may be calculated as the module identifier, combined with value j, and then input to MD5. The modulo operation may be applied to constrain the hash value to the size of hash table 320. In other words, h(i,j) may be equal to MD5(m[i], j) mod s.

Process 600 may further include determining if there is a collision of the calculated hash value (block 630). The collision may be determined by attempting to add module m(i) (in server ID field 430) and hash value h(i,j) (in hash value field 420) at the entry of hash table 320 in which the value in index field 410 matches h(i,j). If there is a non-zero value for hash value field 420 and a different module identifier in server ID field 430, a collision may be determined to occur (block 630—YES). Otherwise, a collision does not occur (block 630—NO).

In the event of no collision, (block 630—NO), the entry corresponding to the calculated hash value and the module identifier may be added to hash table 320 using a mark-and-expand process (block 640). Through the mark-and-expand process, one or more rows of hash table 320 may be modified. The mark-and-expand process may be a two stage process involving: (1) "marking" the entry in hash table 320 for which index field 410 matches the calculated hash value; and (2) expanding the entry, starting at the index field after the marked index field (i.e., h(i,j)+1). Marking the entry may include writing the hash value, h(i,j), to the corresponding hash value field 420 and writing the module identifier to the corresponding module ID field 430. Expanding the entry may include filling hash table 320 sequentially, until an existing entry with a non-zero hash value is encountered, by writing the module identifier to the corresponding module ID field 430 and writing zero values to hash value field 420. During the expansion, hash table 320 may be considered to be a circular table, in which expansion past the end of hash table 320 rewinds to the beginning. As an example of an expansion operation, hash value field 420 at the entry in hash table 320 at index h(i,j)+1 may be checked, and if the hash value is zero, the module identifier may be written at this entry (while keeping the hash value zero). Hash value field 420 at the entry in hash table 320 at index h(i,j)+2 may then be checked, and if the hash value is zero, the module identifier may be written at this entry (while keeping the hash value zero). The expansion may continue until the hash value is non-zero.

Referring back to block 630, in the event of a collision, (block 630—YES), a probe-and-redistribute process may be used to handle the collision (block 650). A collision may be defined as occurring when, in the mark stage, the row that is to be marked already has a non-zero entry in hash value field 420. The probe-and-redistribute process may be a two stage process. The first stage may include searching (probing) for all conflicted entries for the calculated hash value (h(i,j)). An entry may be classified as a conflicted entry when it has the same hash value, h(i,j), but a different module identifier, m(i). In this situation, the next sequential entries may be examined to locate the first entry, the entry at index h(i, j'), that has a hash value of zero in hash value field 420 (the module identifier field 430 may be non-zero). At this point, the redistribute stage may be performed.

The redistribute stage may be generally similar to mark-and-expand, except that new entries may be added in an interleaved fashion using the conflicted entries obtained in the probe stage. The redistribute stage may include adding module identifier, m(i), and hash value, h(i,j), at the entry in hash table 320 having index location h(i, j') (i.e., the first entry determined in the probe stage to have a hash value of zero). Starting from entry index h(i,j'+1), the redistribute stage may further include filling in succeeding entries in an interleaved fashion with different module identifiers that were probed in entry indexes, h(i,j) to h(i,j'), while filling in the value zero for the corresponding hash value fields 420. As an example of the redistribute stage, assume j'=j+2. Thus, three consecutive entries are to be redistributed, starting from entry index h(i,j) to h(i,j+2), each with a hash value, in hash value field 420, of h(i,j). Assume that the module identifiers for these three entries are 11, 15, and 27. In this case, the entries in hash table 320 starting from entry index h(i, j+3) may be filled with the entries (hash value=0, module identifier=11), (hash value=0, module identifier=15), (hash value=0, module identifier=27), (hash value=0, module identifier=11), (hash value=0, module identifier=15), (hash value=0, module identifier=27), . . . , until an existing entry with a non-zero hash value is encountered.

Figure 7:
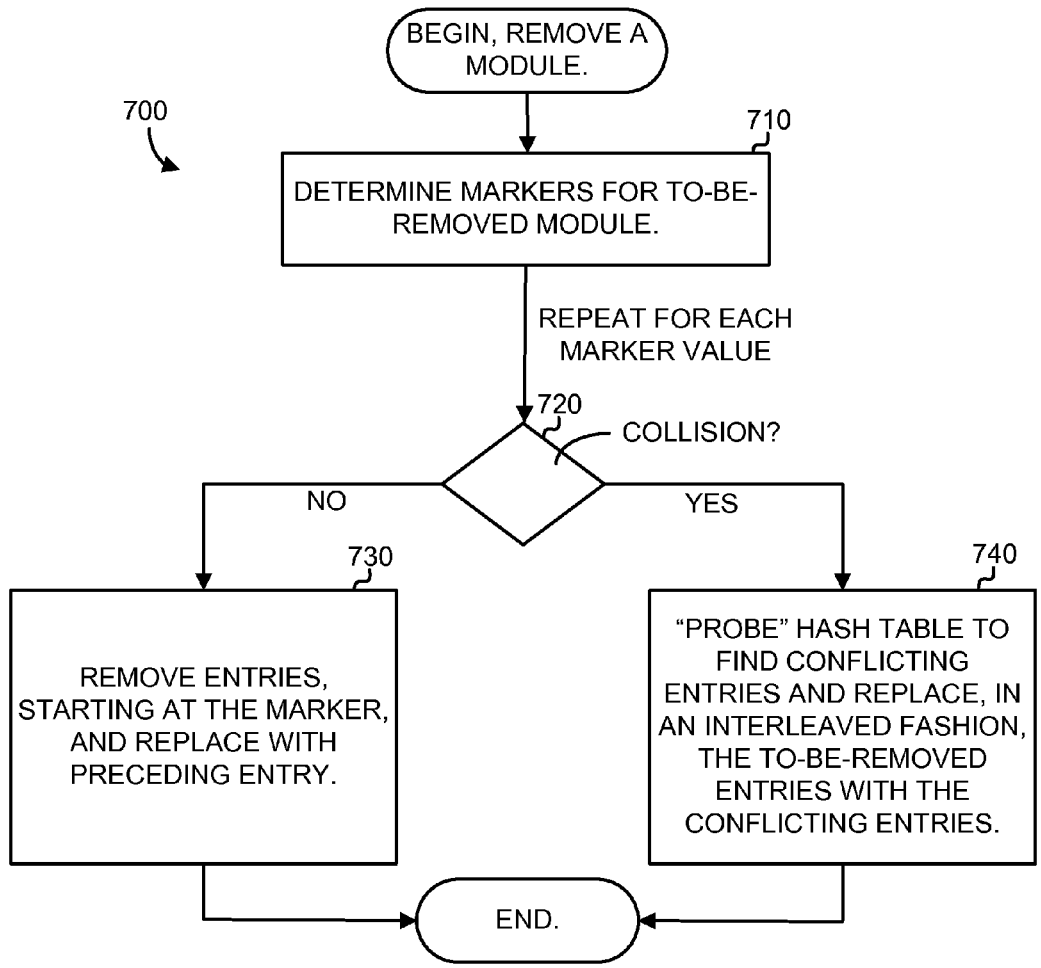
FIG. 7 is a flow chart illustrating an example process for removing a module using a reverse mark-and-expand technique.

FIG. 7 is a flow chart illustrating an example process 700 for removing a module using the reverse mark-and-expand process, as performed in block 550. In general, the reverse mark-and-expand process is similar to the mark-and-expand technique described above in connection with adding a module to module group 145. If there is no collision for the to-be-removed entry, the entries starting at the markers are removed and replaced with preceding entries. If there is a collision of the to-be-removed entries, the conflicting entries may be located and used to replace, in an interleaved fashion, the to-be-removed entries.

Process 700 may include determining the markers for the to-be-removed module (block 710). The markers may correspond to the entry indexes (i.e., the values for h(i,j)) determined in the mark or probe stages when adding the module. In one implementation, the markers determined when adding the corresponding module may be saved and looked-up in block 710. Alternatively, the markers may be recalculated by determining the number of module entries (i.e., the range over which to index j) and the hash values h(i,j)=MD5[h(i), j].

Process 700 may include, for each marker value, which corresponds to a hash value, whether there is a collision (block 720). If there is no collision (block 720—NO), starting at the index in hash table 320 corresponding to the marker, the corresponding hash value field 420 and module ID field 430 may be replaced with the values of the preceding entry in hash table 320 (block 730). This process may be repeated for each entry in hash table 320 that was expanded during the expand stage when the module was added. Thus, entries after the initial marker entry may be replaced if the entry has the same hash value and module ID of the to-be-replaced entry.

If there is a collision (block 720—YES), hash table 320 may be probed, as performed in the probe stage of the module addition (block 740), to locate all of the other conflicting entries. The set of other conflicting entries may then be used to replace, in an interleaved fashion, the to-be-removed entries (i.e., the ones corresponding to the module being removed) with the conflicting entries (block 740).

Figure 8:
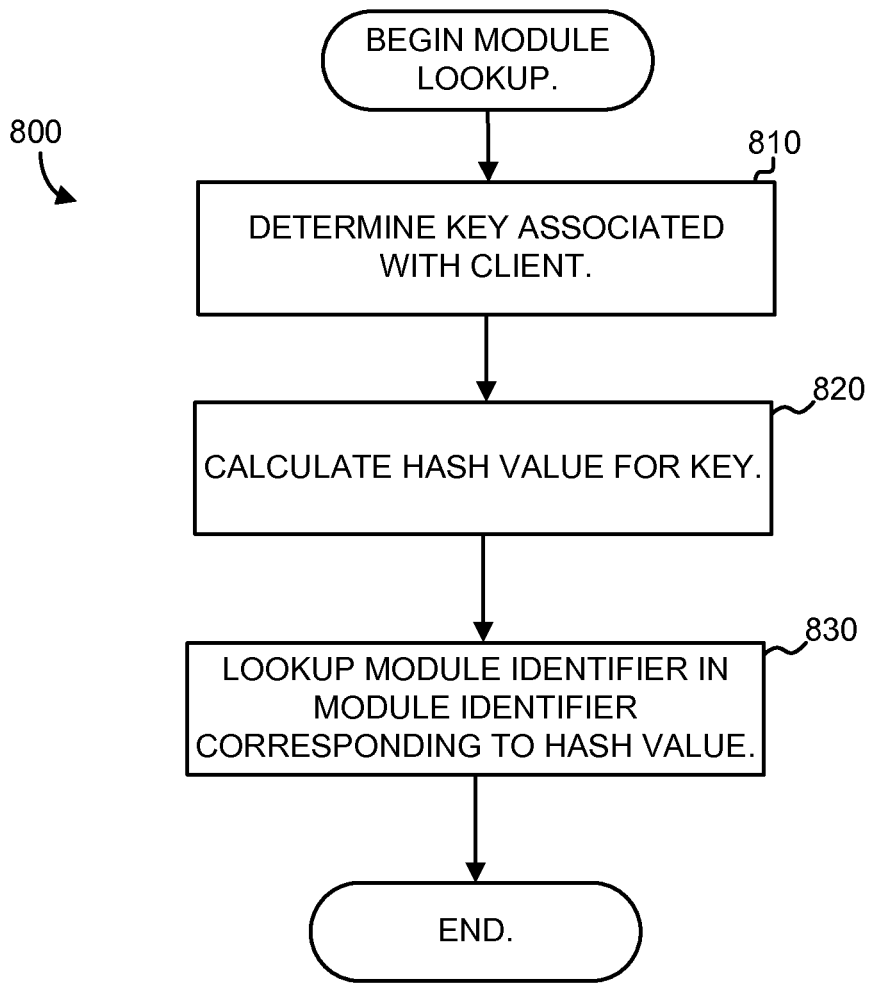
FIG. 8 is a flow chart illustrating an example process for looking up a module in a hash table.

FIG. 8 is a flow chart illustrating an example process 800 for looking up a module in hash table 320, as may be performed by module lookup component 310 in response to receiving incoming traffic/connection requests 340. The lookup operation may correspond to a determination of which of modules 140 should be assigned to handle the particular connecting resource, such as client 110.

Process 800 may include determining a key associated with client 110 (block 810). The key may be, for example, a value associated with the connection request from client 110, such as an IP or MAC address, a port number, a protocol type, a combination of the address/port/protocol information, or other information associated with the request. The hashing function being used, such as MD5, may be applied to the key to generate a hash value (block 820). The hash value may be transformed to the size, s, of hash table 320 using the modulus operation. The final hash value may then be used as an index value, for index field 410, to lookup the module identifier in module ID field 430 (block 830). The module identifier may be used to select one of modules 140.

The lookup operation, as described in process 800, may have a cost of O(1), as there is no collision handling for any lookup.

FIGS. 9A-9E are diagrams illustrating states corresponding to an example of modules being added to a hypothetical hash table 900. In FIGS. 9A-9E, the example hash table has a size of 16 (i.e., s=16).

FIG. 9A may illustrate hash table 900 after initialization of hash table and before any modules have been added to the hash table. All of the hash values and module identifier values may be zero.

Assume that a first module, having a module ID of "1", is added to hash table 900 (FIG. 9B). Further, assume that based on equation (1), four entries are determined to be entered in hash table 900 (i.e., j is iterated from 1 through 4). The hash values for each of the four entries are: 2, 6, 8, and 14. Accordingly, these entry indexes are the markers for module 1. Due to expansion in the mark-and-expand operation, all of the module ID fields are set to the ID, 1, of the added module.

Assume that a second module, having a module ID of "2", is added to hash table 900 (FIG. 9C). Further, assume that based on equation (1), three entries are determined to be entered in hash table 900 (i.e., j is iterated from 1 through 3). The hash values for each of the three entries are: 3, 7, and 9. Accordingly, these entry indexes are the markers for module 2. Due to expansion in the mark-and-expand operation, entries 4, 5, 10, 11, 12, and 13 are expanded so that the module ID field of these entries are set to 2.

Figures 9D, 9E:
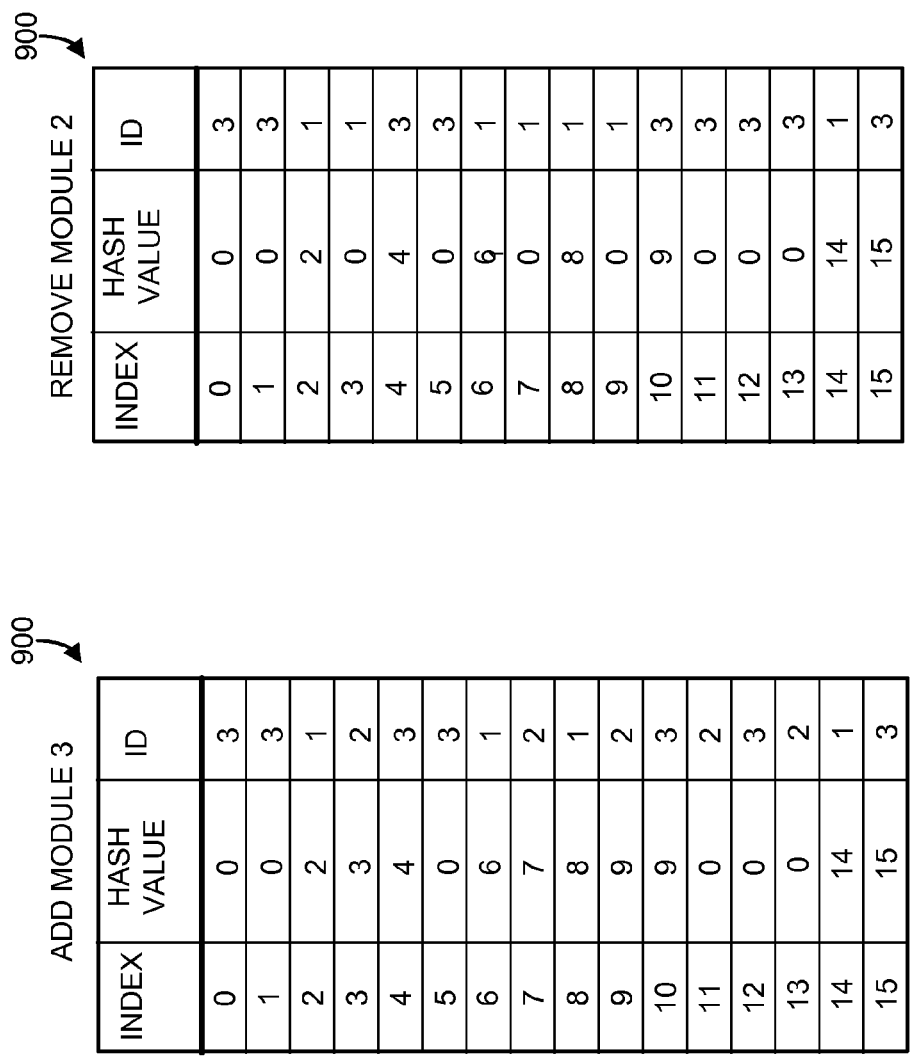

Assume that a third module, having a module ID of "3", is next added to hash table 900 (FIG. 9D). Further, assume that based on equation (1), three entries are determined to be entered in hash table 900 (i.e., j is iterated from 1 through 3). The hash values for each of the three entries are: 4, 9, and 15. Accordingly, these entry indexes are the markers for module 3. Due to expansion in the mark-and-expand option, entries 0 and 1 are expanded from entry 15 and entry 5 is expanded from entry 4. The module ID fields of entries 0, 1, and 5 are thus set to 3. Hash value 9, however, conflicts with hash value 9 for module 2. Accordingly, a probe operation is performed, which may determine that entry 10 is the next open entry. Entry 10 is thus written with hash value 9 and module ID 3. Entries 11, 12, and 13, which have hash values of 0, may then be subject to a redistribute operation, in which modules 2 and 3 are interleaved.

Assume that at some point, module 2 fails and is removed from hash table 900 (FIG. 9E). The markers corresponding to module 2 are the entries 3, 7, and 9. There was no collision with entries 3 and 7, and these entries are removed and replaced with the module identifier of the previous entry and the hash value is set to zero. Entry 9, however, is associated with a collision with module 3. Entry 9 may thus be replaced with the previous entry (module 1) and the previously redistributed entries corresponding to module 2, entries 11 and 13, may be redistributed such that module 3 is written to the module ID of entries 11 and 13.

In a practical implementation, modules 140 may represent a number of possible resources. For example, modules 140 may include computer servers, service cards, cores of a central processing unit, storage servers, etc. One example of load balancing using the techniques discussed above, to load balance among a group of servers, will next be discussed.

Figure 10:
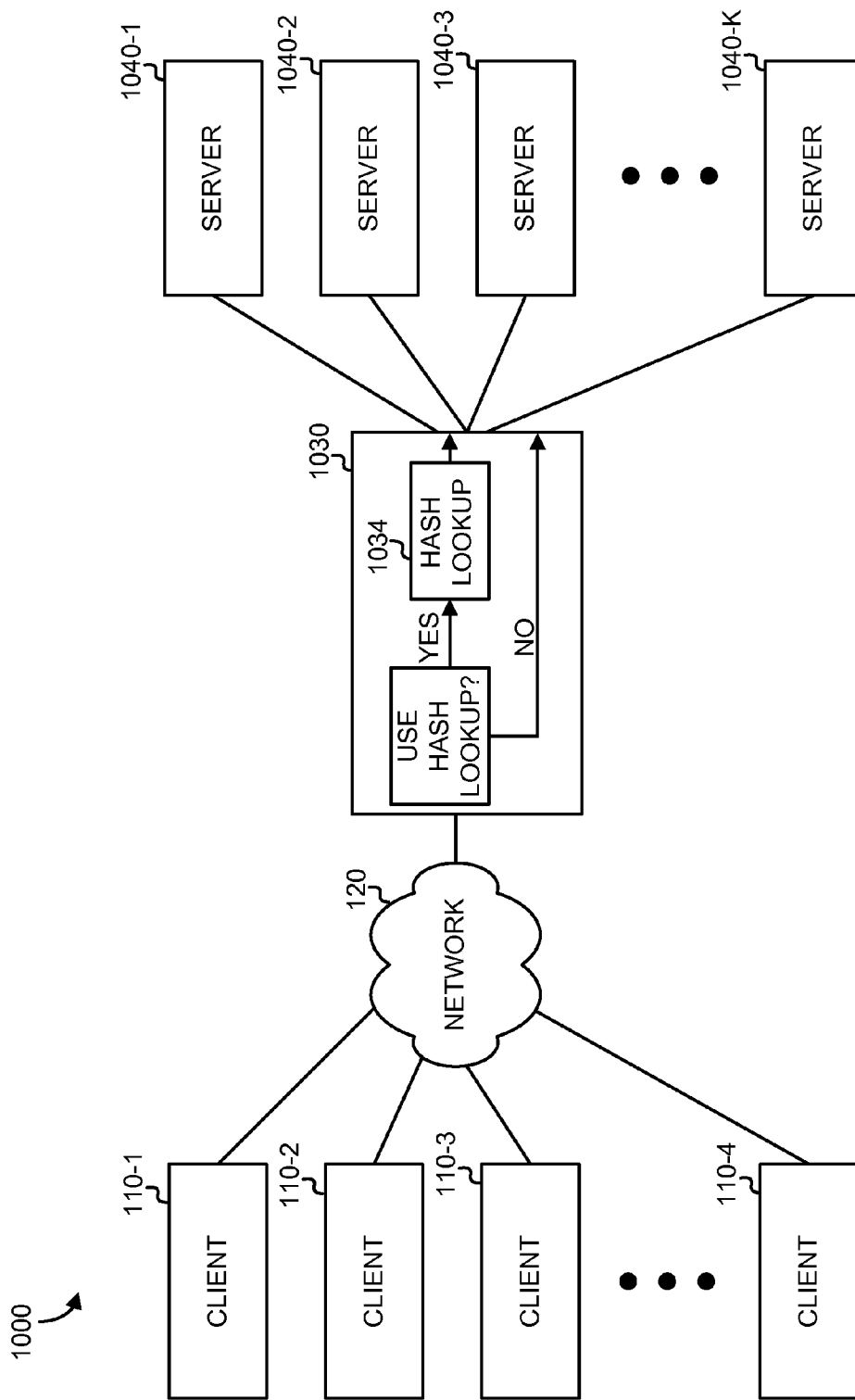
FIG. 10 is a diagram of an example system in which load balancing may be performed.

FIG. 10 is a diagram of an example system 1000 in which load balancing may be performed. In system 1000, clients 110 may connect, through network 120, to load balancer 1030. Load balancer 1030 may operate to balance servers 1040-1 through 1040-*k* (referred to herein collectively as "servers 1040" or generically as "server 1040"). Servers 1040 may be, for example, servers that provide computing services to clients 110.

Clients 110 that initiate connections to servers 1040 may do so by sending a "SYN" packet, which may be used to indicate that a new connection is to be established. Load balancer 1030 may detect the SYN packets. In another possible implementation, information other than a "SYN" packet may be detected to indicate that a new connection is to be established. When a packet is detected that establishes a new connection (e.g., a SYN packet) from a client 110, the packet may be forwarded to a hash lookup component 1034, which may determine, using the fair-weighted hashing techniques discussed previously, a server 1040 to which client 110 is to connect. Packets that are not SYN packets, such as packets that are part of an existing connection with one of servers

1040, may be forwarded to the appropriate server 1040. Alternatively, in some implementations, all packets may be forwarded to hash lookup component 1034.

In operation, load balancer 1030 may act as a "virtual" server to which all clients 110 initially connect. Load balancer 1030, using hash lookup component 1034, may then select an appropriate "real" server 1040. Advantageously, using load balancing with the fair weighted hashing technique discussed above, real server entries inside hash table 320 may be relatively evenly distributed, which may serve the purpose of load balancing. Each real server 1040 may get an almost equal (weighted) chance to serve the client request.

As a further advantage of the fair weighted hashing technique, servers 1040 can be added or removed at any time. The mark-and-expand and reverse mark-and-expand techniques for adding or removing servers 1040 from hash table 320 may be used to keep hash table 320 relatively evenly distributed after the addition or removal of a real server. When a new server 1040 is added, hash table 320 may be updated and new entries assigned to the new server 1040 without impacting existing connections to other servers 1040. Accordingly, when a server 1040 fails, the failing server 1040 may be removed from hash table 320 in a manner in which the load of the failed server 1040 is generally redistributed evenly to the remaining active servers 1040. Similarly, when a new server 1040 is added, such as by an administrator dynamically "hot plugging" or "hot swapping" the new server 1040, hash table 320 may be updated and new entries assigned to the new server 1040 in a manner that evenly integrates the new server 1040 into hash table 320.

As a further potential advantage of the above-described fair weighted hashing technique, selection of a server 1040 for a client 110 may be efficient. In particular, since the underlying hash function has deterministic O(1) cost for each lookup, it takes almost constant time for any requests from any client to find a server 1040. Thus, high networking performance with minimum service variation may be achieved.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5-8, the order of the blocks may be modified in other implementations. Moreover, non-dependent blocks may be implemented in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    maintaining, by a device, a table that indicates how incoming client resource requests are to be distributed among a plurality of modules;
    updating the table, by the device and based on an indication that an additional module, associated with a module identifier, is to be included in the plurality of modules, by:
        determining a number of entries to add to the table for the additional module,
        calculating a first hash value for each entry of the number of entries, and
        modifying the table by writing the module identifier to one or more sequential entries of the table,
            an index, of a first entry of the one or more sequential entries, corresponding to the first hash value;
    updating the table, by the device and based on an indication to remove a particular module of the plurality of modules,
        a particular module identifier, of the particular module, being associated with the indication to remove the particular module,
        updating the table based on the indication to remove the particular module including:
            overwriting entries, in the table corresponding to the particular module identifier, with a previous entry in the table; and
    looking up, by the device, one of the plurality of modules to handle a particular incoming client resource request, based on a second hash value obtained from information in the particular incoming client resource request,
        the second hash value being used as an index into the table to lookup a module identifier of the one of the plurality of modules to handle the particular incoming client resource request.

2. The method of claim 1, where each of the plurality of modules includes one or more of computer servers, service cards, cores of a central processing unit, or storage servers.

3. The method of claim 1, where the table includes, for each entry in the table, a field to store a hash value and a field to store a module identifier of a corresponding module of the plurality of modules.

4. The method of claim 3, where modifying the table by writing the module identifier, associated with the additional module, to the one or more sequential entries of the table further includes:
    sequentially writing the module identifier, associated with the additional module, to entries in the table until the field to store the hash value, of an entry in the table, includes a non-zero value.

5. The method of claim 1, where determining the number of entries to add to the table for the additional module includes:
    determining the number of entries based on a weight assigned to the additional module, where the weight indicates a capacity of the additional module relative to capacities of other modules of the plurality of modules.

6. The method of claim 1, where calculating the first hash value for each of the number of entries includes calculating the first hash value based on the module identifier, associated with the additional module, and based on an index relating to the number of entries.

7. The method of claim 1, where updating the table based on the indication that the additional module is to be included in the plurality of modules includes:
modifying the table, when the first hash value conflicts with an entry already included in the table, by interleaving the module identifier, associated with the additional module, with one or more module identifiers corresponding to module identifiers of conflicting entries.

8. The method of claim 1, where the indication to remove the particular module is generated automatically based on a failure of the particular module.

9. The method of claim 1, where overwriting the entries in the table includes overwriting a plurality of sequential entries in the table.

10. A device comprising:
a data structure that includes a plurality of entries,
each of the plurality of entries including an index into the data structure, a hash value field, and a module identifier field,
the module identifier field identifying modules of a plurality of modules that provide a computing or data storage service to client devices;
a first component, implemented at least partially in hardware, to:
update the data structure, based on an indication that a module, associated with a particular module identifier, is to be added to the plurality of modules,
update the data structure, based on an indication to remove a particular module of the plurality of modules,
a module identifier, of the particular module, being associated with the indication to remove the particular module,
the first component, when updating the data structure based on the indication that the module is to be added to the plurality of modules, is to write the particular module identifier and a first hash value, associated with the module that is to be added, to one or more sequential entries of the data structure in the module identifier field and the hash value field, respectively,
the index, of a first entry of the one or more sequential entries, corresponding to the first hash value,
the first component, when updating the data structure based on the indication to remove the particular module, is to:
overwrite entries, in the data structure, with a previous entry in the data structure,
the entries corresponding to the module identifier of the particular module; and
a second component to lookup, based on a second hash value obtained from information in a particular incoming client resource request, a module identifier of one of the plurality of modules to handle the particular incoming client resource request,
the second component being implemented at least partially in hardware,
the second hash value being used as the index into the data structure to lookup the module identifier of the one of the plurality of modules to handle the particular incoming client resource request.

11. The device of claim 10, where the module identifier, of the one of the plurality of modules, includes an Internet Protocol (IP) address or a media access control (MAC) address.

12. The device of claim 10, where, when updating the data structure based on the indication that the module is to be added to the plurality of modules, the first component is to:
determine a number of entries to add to the data structure for the module that is to be added,
the one or more sequential entries being associated with the number of entries; and
write the module identifier and the first hash value, to the data structure, for each entry of the number of entries,
where the first hash value is recalculated for each entry of the number of entries.

13. The device of claim 12, where the first component is to determine the number of entries to add to the data structure based on a weight assigned to the module that is to be added,
where the weight indicates a capacity, of the module that is to be added, relative to capacities of other modules of the plurality of modules.

14. The device of claim 10, where each of the plurality of modules includes one or more of computer servers, service cards, cores of a central processing unit, or storage servers.

15. The device of claim 10, where the indication to remove the particular module is generated automatically based on a failure of the particular module.

16. The device of claim 10, where, when overwriting the entries, the first component is to overwrite a plurality of sequential entries in the data structure.

17. The device of claim 10, where the entries, corresponding to the module identifier of the particular module, include particular information, and
where, when overwriting the entries, the first component is to replace the particular information with information included the entries prior to the particular information being included in the entries.

18. A system comprising:
a plurality of modules to provide computing or data storage services to client devices; and
a load balancer, implemented at least partially in hardware, to:
maintain a data structure that stores information indicating how incoming client resource requests are to be distributed among the plurality of modules;
update the data structure based on an indication that an additional module, associated with a module identifier, is to be included in the plurality of modules,
when updating the data structure, the load balancer is further to:
determine a number of entries to add to the data structure for the additional module,
calculate a first hash value for each entry of the number of entries, and
modify the data structure,
when modifying the data structure, the load balancer is to write the module identifier to one or more sequential entries of the data structure,
an index, of a first entry of the one or more sequential entries, corresponding to the first hash value,
the one or more sequential entries corresponding to the number of entries;

update the data structure, based on a particular indication to remove a particular module of the plurality of modules,
    a particular module identifier, of the particular module, being associated with the indication to remove the particular module,
    when updating the data structure based on the particular indication, the load balancer is further to:
        overwrite entries, in the data structure corresponding to the particular module identifier, with a previous entry in the data structure; and
lookup one of the plurality of modules to handle a particular incoming client resource request, based on a second hash value obtained from information in the particular incoming client resource request,
    the second hash value being used as an index into the table to lookup a module identifier of the one of the plurality of modules to handle the particular incoming client resource request.

19. The system of claim 18, where each of the plurality of modules includes one or more of computer servers, service cards, cores of a central processing unit, or storage servers.

20. The system of claim 18, where, when determining the number of entries, the load balancer is to:
determine the number of entries based on a weight assigned to the additional module,
    where the weight indicates a capacity, of the additional module, relative to a capacity of other modules of the plurality of modules.

21. The system of claim 18, where the entries, corresponding to the particular module identifier, include particular information, and
where, when overwriting the entries, the load balancer is to replace the particular information with information included in the entries prior to the particular information being included in the entries.

22. The system of claim 18, where the particular module identifier includes an Internet Protocol (IP) address or a media access control (MAC) address.

\* \* \* \* \*